A. MÜLERTZ.
MACHINE FOR UNEARTHING AND GATHERING ROOTS AND THE LIKE.
APPLICATION FILED JUNE 27, 1916.

1,347,962.

Patented July 27, 1920.

Inventor
André Mülertz,
By: O. Singer
Atty.

UNITED STATES PATENT OFFICE.

ANDRÉ MÜLERTZ, OF COPENHAGEN, DENMARK.

MACHINE FOR UNEARTHING AND GATHERING ROOTS AND THE LIKE.

1,347,962.

Specification of Letters Patent.   Patented July 27, 1920.

Application filed June 27, 1916.   Serial No. 106,233.

*To all whom it may concern:*

Be it known that I, ANDRÉ MÜLERTZ, a subject of the King of Denmark, residing at Copenhagen, Denmark, have invented a new and useful Improvement in Machines for Unearthing and Gathering of Roots and the like; and I do hereby declare the following to be a full, clear, and exact description of the same.

The present invention relates to machines for unearthing or digging up of roots, for instance potatoes, beets or the like.

When the machine by means of a motor or by traction of horses is moved over the ground the revolving main shaft carrying the wheels of the machine through a suitable gearing and a sprocket chain rotates a shaft mounted at top of the machine with a relatively great speed. Said shaft drives two endless chains provided with digging shovels which loosen the roots from the ground and transport the loosened roots with the adherent earth to the top of the machine, where the shovels give off their contents on a swing sieve moved from the upper shaft so that the earth is sifted off through a relatively close grating, while the roots separated from the earth and the plants slide over the grating to another grating-member with larger openings where they drop down on inclined spouts or chutes which guide them to the sides of the machine and throw them off on the ground or in gathering devices transported with the machine. The plants separated from the roots slide over the swing sieve and are thrown off at the back of the machine.

Figure 1:
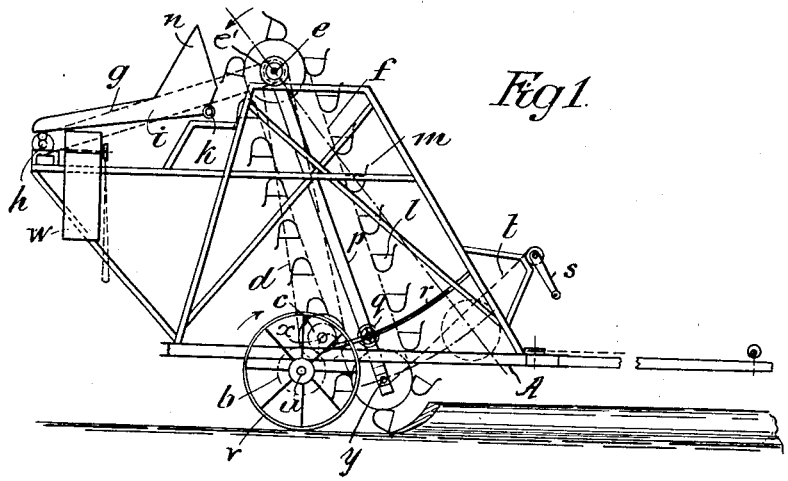
Figure 2:
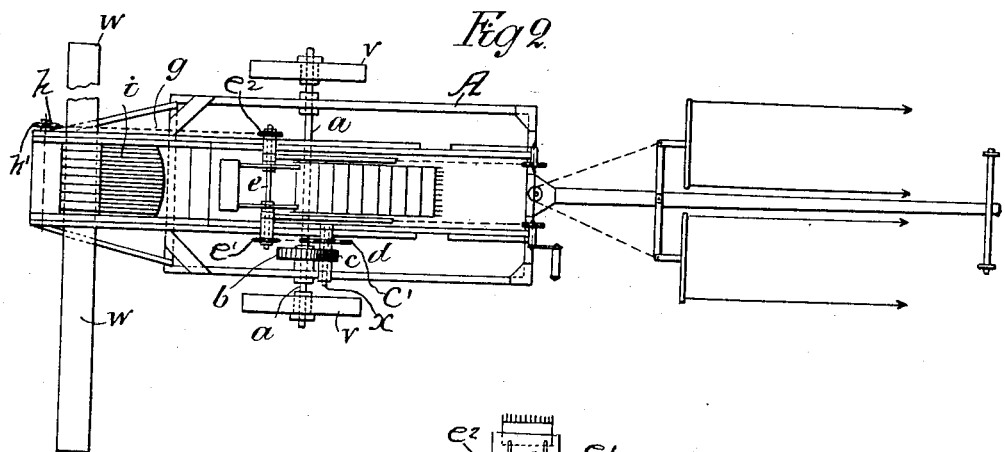
Figure 3:
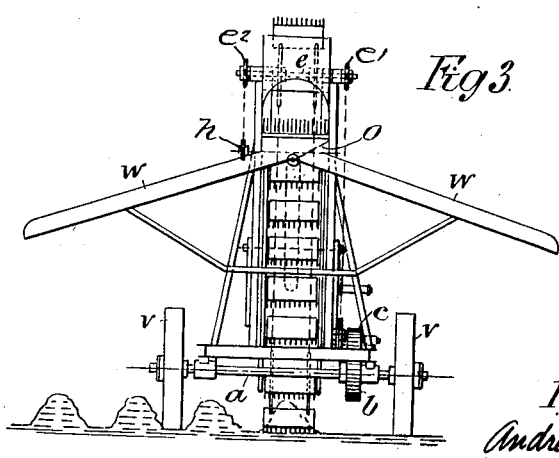

An embodiment of the invention is represented on the drawing, where Figure 1 shows a side-view, Fig. 2 a plan and Fig. 3 a rear-view of the machine.

From the main shaft $a$ the upper shaft $e$ is driven by means of the gear-wheels $b$ and $c$ and the sprocket chain $d$. Gear $c$ together with a sprocket wheel $c'$ is on a shaft $x$ which is mounted on the main frame A. Said shaft $e$ has sprocket wheels $e'$, $e^2$ and moves the two digging chains $f$ and the sprocket chain $g$, which through the shaft $h$ and knags mounted on said shaft moves the swing sieve $i$ pivoted at $k$ up and down. The chain $d$ connects the wheels $c'$, $e'$, and the chain $g$ connects the wheel $e^2$ with a wheel $h'$ which is on the shaft $h$ as shown. The shaft $x$ has the gear $c$ which engages the gear $b$. The digging chains $f$ carry in the usual manner digging buckets $l$ having their bottom and sides perforated or grating-shaped in order to let the loosened earth pass, while rounded and forwardly bent steel-teeth $m$ are provided along their foresides. These curved steel-teeth act to loosen the roots from the rootlets of the plant already during the digging up of the roots without injuring the plant itself.

The swing sieve $i$ has at its upper end a hopper $n$ for receiving the contents of the buckets so that said contents are dispersed over the sieve $i$. The first part of said sieve consists of bars closely arranged side by side so that only earth and pebbles are permitted to pass through said part of the sieve while the grating or sieve over the two inclined chutes is so open that the roots drop down on said chutes. The plants are retained by the sieve and slide over it to its rear part where they are thrown off. By means of a sort of damper or slide $o$, Fig. 3, one of the chutes $w$ may be closed so that only the other chute is used.

The device for digging up the roots may be adjusted to dig to a greater or smaller depth in the ground, as the whole device with chains and buckets is pivoted on the shaft $e$, whereby the power transmission is maintained unaltered whereas the lowermost part of the digging device may be swung forward and upward, for instance by means of the crank $s$ and the chains $t$. In order to effect such an adjustment in a simple manner the lower shaft $y$ of the endless digging device is mounted on levers $p$ turnable on the shaft $c$. The position of said wheels is secured by screwing the hand wheels $q$ against the curved guide-bar $r$ provided with a slit.

By means of a pawl or clutch arrangement it is attained that the driving wheels $v$ only make the shaft $a$ revolve during the forward movement of the machine whereas the shaft $a$ and therewith the whole machinery is inactive if the wheels $v$ turn backward or when the machine with disconnected pawl device is moved to and from the working-place.

The different parts of the machine may be otherwise constructed and assembled within the scope of the invention.

Having thus fully described my invention, I claim as new and desire to secure by Letters Patent in U. S. A.:

A root harvester comprising a main frame, a shaft mounted in said frame and having supporting wheels and a gear, a second shaft mounted on said frame and having a gear engaging the first named gear and also having a sprocket wheel, a third shaft mounted at an elevated point on said frame, said third shaft having sprocket wheels one of which is connected by an endless sprocket chain with the first named sprocket wheel, a swinging frame mounted on said third shaft, an endless digging device mounted in said swinging frame, and means to adjust said swinging frame and hold the same at any desired inclination, a swinging sieve on which said digging device discharges, and a shaft having means to swing said sieve, said last named shaft having a sprocket wheel, and an endless sprocket chain connecting said sprocket wheel with the other sprocket wheel of the third mentioned shaft.

In testimony whereof I affix my signature in presence of two witnesses.

ANDRÉ MÜLERTZ.

Witnesses:
 CECIL V. SCHOU,
 GRETHE DAM.